United States Patent [19]

Tsuchimoto et al.

[11] Patent Number: 5,705,289
[45] Date of Patent: Jan. 6, 1998

[54] PROCESS AND APPARATUS FOR PEELING OUTER TUBES FROM SPENT NAS CELLS

[75] Inventors: Tomonori Tsuchimoto, Hashima-Gun; Yoshihiko Kurashima, Nagoya; Katsuichi Iwata, Ichinomiya, all of Japan

[73] Assignee: NGK Insulators, Ltd., Japan

[21] Appl. No.: 699,033

[22] Filed: Aug. 19, 1996

Related U.S. Application Data

[62] Division of Ser. No. 451,736, May 26, 1995, Pat. No. 5,600,879.

[30] Foreign Application Priority Data

Jul. 25, 1994 [JP] Japan ........................ 6-172548
Apr. 13, 1995 [JP] Japan ........................ 7-087979

[51] Int. Cl.⁶ .................................................. H01M 6/50
[52] U.S. Cl. .......................... 424/49; 29/403.3; 29/426.4; 29/763; 83/924; 82/46
[58] Field of Search .................... 429/49; 29/403.3, 29/426.4, 763, 426.5; 83/862, 871, 886; 82/46, 53, 70.1, 101; 144/708.4, 708.6, 207

[56] References Cited

U.S. PATENT DOCUMENTS

| | | | |
|---|---|---|---|
| 2,830,630 | 4/1958 | Uhcenkogg | 144/208.6 |
| 4,058,886 | 11/1977 | Alvarez | 29/763 |
| 4,279,067 | 7/1981 | Jenks | 29/239 |
| 4,510,679 | 4/1985 | Aceem et al. | 29/426.4 |
| 4,624,168 | 11/1986 | Borzym | 83/862 |
| 5,543,242 | 8/1996 | Tsuchimotot et al. | 429/49 |
| 5,587,252 | 12/1996 | Tsuchimoto et al. | 429/49 |

*Primary Examiner*—M. Nuzzolillo
*Attorney, Agent, or Firm*—Parkhurst, Wendel & Burr, L.L.P.

[57] ABSTRACT

A process for peeling an outer tube of a spent NaS cell, including the steps of: (1) holding opposite end portions of the spent NaS cell; (2) forming annular cut lines in the outer tube of the cell at the opposite end portions; (3) forming a straight cut line in the outer tube to be continued to the annular cut lines; (4) inserting a pawl into the straight cut line; and (5) peeling the outer tube of the spent NaS cell by turning at least one of the spent NaS cell and the pawl relative to each other. Instead of the pawl, a chisel may be inserted into the straight cut line, and the outer tube of the spent NaS cell is peeled by applying an impact force upon the outer tube of the cell through the chisel. Apparatuses for peeling the outer tube from the spent NaS are also disclosed.

5 Claims, 4 Drawing Sheets

FIG._4
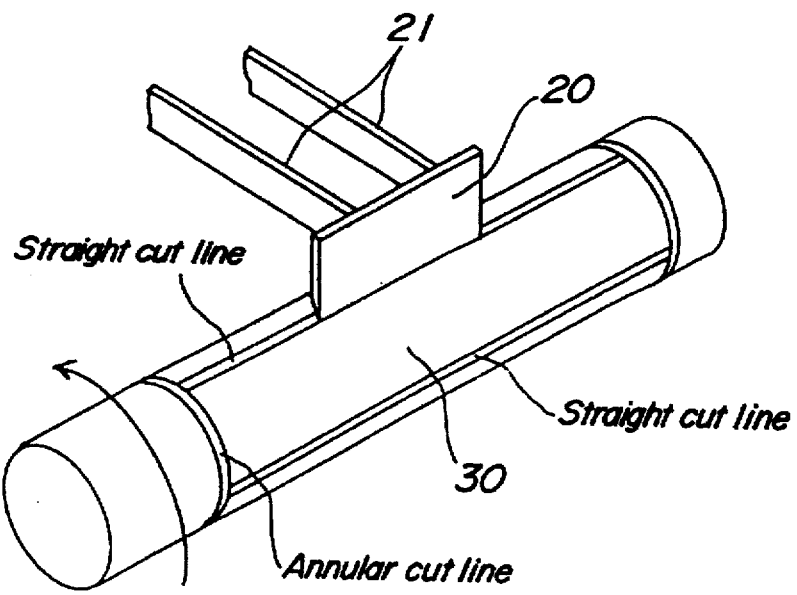
FIG._5
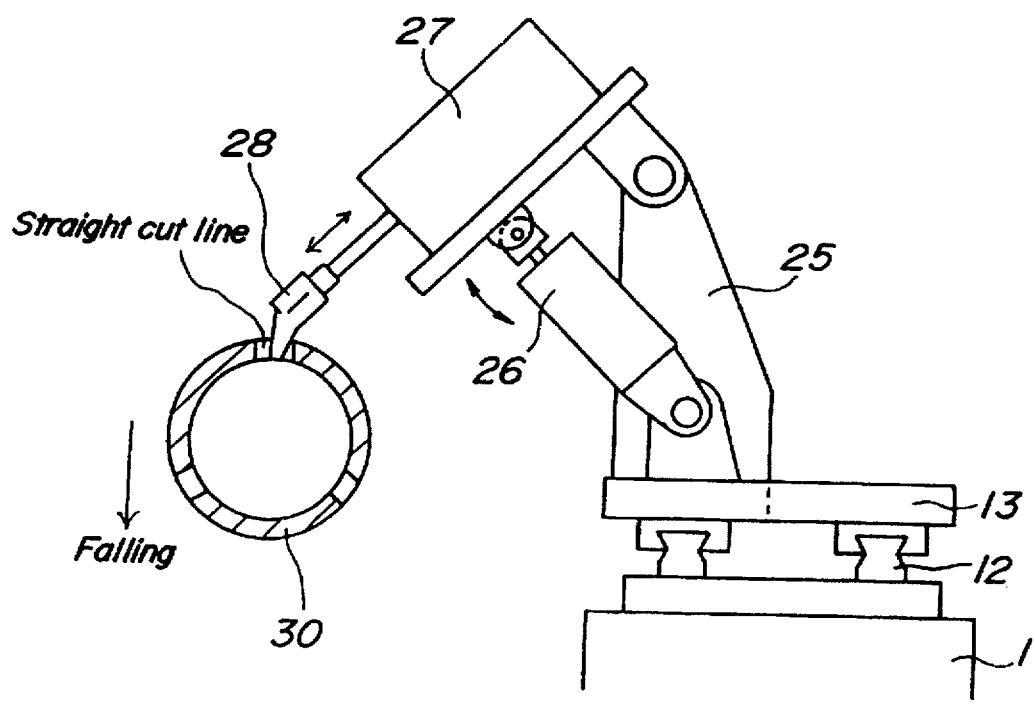

Straight cut line

PROCESS AND APPARATUS FOR PEELING OUTER TUBES FROM SPENT NAS CELLS

This is a Division of application Ser. No. 08/451,736 filed May 26, 1995, now U.S. Pat. No. 5,600,879.

BACKGROUND OF THE INVENTION

1. Field of the Invention

The present invention relates to a process and an apparatus for peeling outer tubes from spent NaS cells, which are to be used in the disposal of spent NaS cells.

2. Related Art

In an NaS cell, sodium and sulfur are disposed on opposite sides of a solid electrolyte tube made of β- alumina, and the entire assembly is protected by an outer tube made of aluminum. Such NaS cells have been developed as cells for storing large amounts of electric power and as cells for electric automobiles. However, it is presumed that since the service life of the NaS cell is around 10 years, a huge number of spent NaS cells will come out in the future.

The present inventors have been developing techniques for disposing of such spent NaS cells. In this disposal process, the outer tube needs to be peeled from the spent NaS cell. In order to peel the outer tube, it is a conventional practice that the spent NaS cell is chucked on a lathe, cut lines are circumferentially formed in opposite end portions of the outer tube, then the cell is set at a milling machine where a middle portion of the outer tube is divided into two or three sections by axially forming straight cut lines in the outer tube with the use of an end mill, and the outer tube is peeled and removed by hand along the thus formed cut lines. However, the above process has poor working efficiency, and suffers from high equipment cost because the lathe and the milling machine are required.

SUMMARY OF THE INVENTION

It is an object of the present invention to solve the above-mentioned problems, and to provide a process and an apparatus for peeling outer tubes form spent NaS cells, in which the outer tubes can be effectively peeled from the spent NaS cells by a single apparatus.

According to the process for peeling the outer tube of the spent NaS cell in a first aspect of the present invention, which process has been accomplished to solve the above-mentioned problems, while opposite end portions of the spent NaS cell are held, annular cut lines are formed in the outer tube of the cell at the opposite end portions, a straight cut line is formed in the outer tube to be continued to the annular cut lines, a pawl is inserted into the straight cut line, and the outer tube of the spent NaS cell is peeled by turning at least one of the spent NaS cell and the pawl relative to each other.

According to the process for peeling the outer tube of the spent NaS cell in a second aspect of the present invention, while opposite end portions of the spent NaS cell are held, annular cut lines are formed in the outer tube of the spent NaS cell at the opposite end portions, a straight cut line is formed in the outer tube to be continued to the annular cut lines, a chisel is inserted into the straight cut line, and the outer tube of the spent NaS cell is peeled by applying an impact force upon the outer tube of the cell through the chisel.

According to the apparatus for peeling the outer tube from the spent NaS cell in a third aspect of the present invention, the apparatus comprises a holder for holding opposite ends of the spent NaS cell, a cutter for forming an annular cut line and a straight cut line in the outer tube of the spent NaS cell, a peeler including a pawl to be inserted into the straight cut line formed in the outer tube of the spent NaS cell and adapted for peeling the outer tube by using the pawl, and means for turning at least one of the spent NaS cell and the pawl around a center axis of the holder so that the cell and the pawl may be turned relative to each other. As the pawl, a chisel may be used. In this case, the turning means is replaced by means for applying an impact force upon the outer tube of the cell through the chisel.

According to the spent NaS cell outer tube-peeling process of the first aspect of the present invention, the spent NaS cell is first held at the opposite end portions, the annular cut lines are formed at the opposite end portions of the outer tube, then the straight cut line, or preferably two or three straight cut lines, are formed in the outer tube of the cell to be continued to the annular cut lines. Thereafter, the pawl is inserted into the straight cut line formed in the outer tube of the cell, and thereafter at least one of the cell and the pawl is turned relative to each other to peel a portion of the outer tube between the annular cut lines. Then, the remaining bottom end portion of the outer tube is removed. When the chisel is used instead of the pawl, after the chisel is inserted into the straight cut line of the outer tube, the impact force is tangentially applied to the outer tube by reciprocatedly pressing the chisel against the cut end of the outer tube and the remainder of the cell, while the spent NaS cell is stopped.

According to the Spent NaS cell outer tube-peeling apparatus of the present invention, after the spent NaS cell is set .by the holder, the annular cut lines are formed at the opposite end portions of the outer tube of the spent NaS cell, by means of the cutter arranged sideway of the cell, through turning the cutter and the cell relative to each other. Then, the turning is stopped, the straight cut line, preferably two or three straight cut lines are longitudinally formed and spaced in a circumferential direction in the outer tube by moving the cutter such that the straight cut line or lines may be continued to the annular cut lines. Then, the pawl of the peeler is inserted into the straight cut line formed in the outer tube, and at least one of the pawl and the spent NaS cell is slowly turned relative to each other by means of the turning means. Thereby, a portion of the outer tube between the annular cut lines is peeled. Finally, the remaining bottom end portion is removed. When the chisel is used instead of the pawl, the turning means is braked and the spent NaS cell is stationary, and the impact forces are tangentially applied to the outer tube by reciprocating the chisel. Thereby, a portion of the outer tube between the opposite end portions of the cell is peeled. Finally, the bottom end portion of the outer tube is removed. According to the present invention, the outer tube can be automatically peeled from the spent NaS cell by using a single peeling apparatus.

These and other objects, features and advantages of the invention will be appreciated upon reading the following description of the invention when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein:

FIG. 4 is a perspective view for illustrating a peeling step;

FIG. 5 is a side view of an apparatus for peeling an outer tube of a spent NaS cell as another embodiment according to the present invention.

DETAILED DESCRIPTION OF THE INVENTION

The present invention will now be explained in more detail with reference to the attached drawings.

Figure 1:
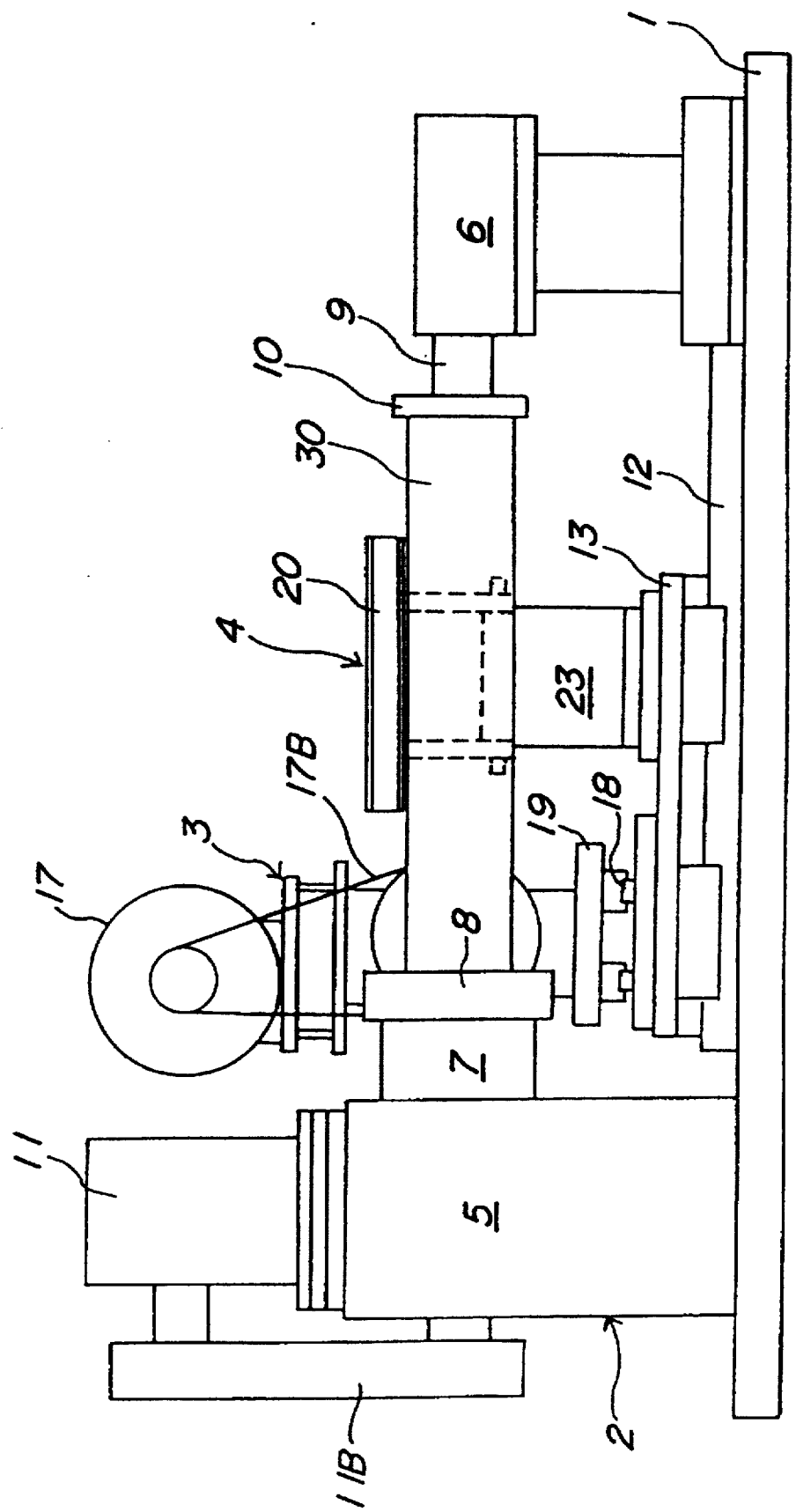
FIG. 1 is a front view of an apparatus for peeling an outer tube of a spent NaS cell as one embodiment according to the present invention.

FIG. 1 is a plane view for illustrating the entire apparatus for peeling the outer tube of the spent NaS cell as one embodiment. On a base 1 are arranged a turning means 2, a cutter 3, and a peeler 4. The turning means 2 includes a head stock 5 and a tail stock 6 as in the case of an ordinary lathe. A chuck 8 is provided as a holder unit at a tip of a main spindle 7 extending horizontally from the head stock 5. On the other hand, a chuck 10 is also provided as a holder unit at a tip of a tail spindle 9 extending horizontally from the tail stock 6. The opposite end portions of a spent NaS cell 30 are assuredly held by the chucks 8 and 10 as the holder units such that the cell may be turned around its central axis.

The spent NaS cell 30 is turned by a motor 11 placed above the head stock 5 via a transmission belt 11B and the main shaft 7. The rotating speed of the motor 11 is freely variable, and the motor has a braking function itself. Therefore, the motor can turn the spent NaS cell at a high turning speed or at a low turning speed or can stop and stationarily keep the cell.

A pair of first rails 12 are provided on the upper face of the base 1 such that the rails extend in the axial direction of the spent NaS cell 30. A first slide table 13 is arranged on the first rails 12. A first slide table 13 is freely slidably movable on and along the first rails 12 by means of a hydraulic cylinder (not shown). The above-mentioned cutter 3 and peeler 4 are installed above the slide table 13.

Figure 2:
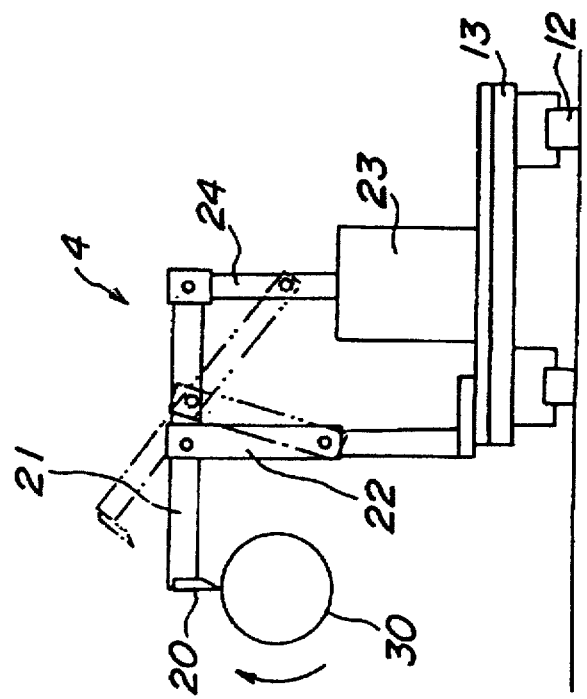
FIG. 2 is a side view of a cutter of the spent NaS cell outer tube-peeling apparatus according to the present invention.

As shown in FIGS. 1 and 2, the cutter 3 includes a cutting blade 16 attached to a tip of a horizontal rotary shaft 15, which is supported by a bearing 14 and rotated by a motor 17 via a motor belt 17B. A second slide table 19 is slidably placed on and along a pair of second rails 18 provided on the slide table 13. The entire cutter 3 is installed on the second slide table 19. The second slide table 19 is moved on and along the second rails 18 by a hydraulic cylinder not shown. Thus, the cutting blade 16 can be moved away from or near to the spent NaS cell 30.

Figure 3:
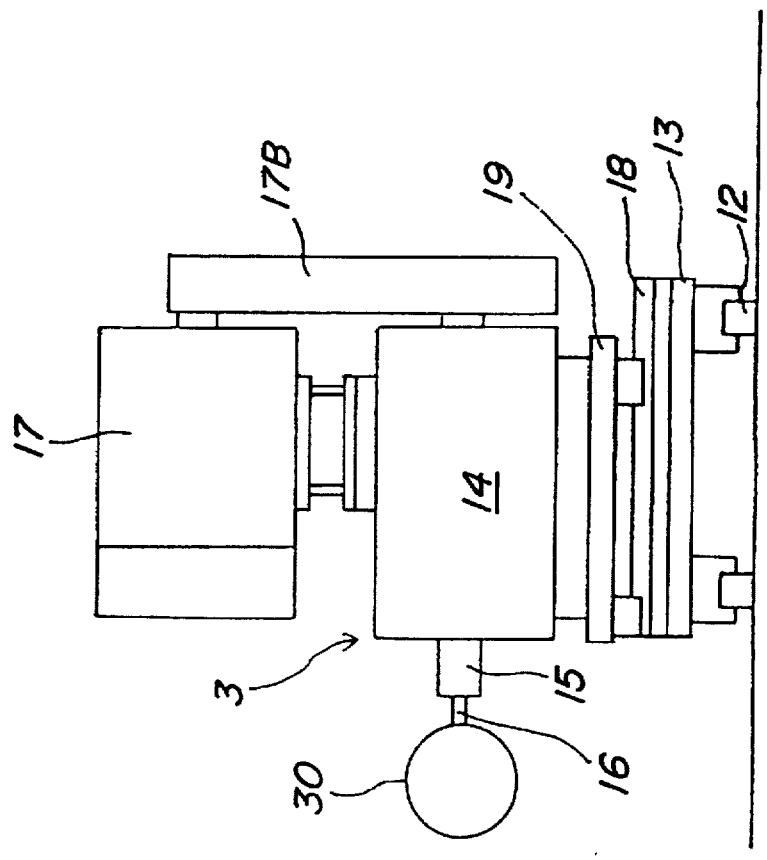
FIG. 3 is a side view of a peeler of the spent NaS cell outer tube-peeling apparatus according to the present invention.

On the other hand, the peeler 4 is installed on the first slide table 13 at a location adjacent to the cutter 3, and has a pawl 20 as shown in FIGS. 1, 3 and 4. More specifically, the pawl 20 is provided at a tip of an arm 21, which is supported at a central portion by a link 22. The rear end of the arm 21 is connected to an upper end of a rod 24 which is in turn fitted into a hydraulic cylinder 23 at a lower end. By so constructing, when the rod 24 of the cylinder 23 is retracted, the pawl 20 is located at an elevated position as shown in FIG. 3 by an imaginary line. When the rod 24 of the cylinder 23 is extended, the pawl 20 is descended into the straight cut line formed in the outer tube of the spent NaS cell 30 by means of the cutting blade 16.

The outer tube of the spent NaS cell is peeled by using the thus constituted spent NaS cell outer tube-peeling apparatus according to the present invention as follows. That is, the spent NaS cell is set between the chucks 8 and 10 provided as the holder units in the turning means 2, and is turned at a low speed. Then, while the cutting blade 16 of the cutter 3 is being rotated, the cutting blade 16 is approached to the spent NaS cell 30 and annular cut lines are formed in the outer tube at the opposite end portions thereof. Next, after the turning of the spent NaS cell 30 is stopped and the main shaft is braked, the cutter 3 is moved along the rails 12, while the cell of the cutting blade 16 is being rotated. Thereby, two or three straight cut lines are axially formed and continued to the annular cut lines to divide a portion of the outer tube between the annular cut lines in a circumferential direction. As a result, as shown in FIG. 4, the two annular cut lines and two or three straight cut lines connecting the two annular cut lines are formed in the outer tube of the spent NaS cell 30.

Next, the cutter 3 is retracted from the cell 30, and the pawl 20 of the peeler 4 provided on the slide table 13 at a location near the cutter 3 is descended into the straight cut line of the spent NaS cell 30. At that time, in order to snugly insert the tip of the pawl 20 into the straight cut line, the spent NaS cell 30 is turned by 90° C. by the turning means 2, so that the straight cut line is located at the uppermost face of the cell. The tip of the pawl 20 has a triangular sectional shape as shown in FIGS. 3 and 4. After the tip of the pawl 20 is inserted into the straight cut line, the spent NaS cell 30 is slowly turned by the turning means 2 in an arrow direction shown in FIGS. 3 and 4. As a result, a portion of the outer tube between the annular cut lines is forcedly peeled. Then, the remaining cut bottom end portion of the outer tube is manually removed.

In the above-mentioned first embodiment of the spent NaS cell outer tube-peeling apparatus according to the present invention, the pawl 20 is inserted into the straight cut line, and the outer tube is peeled by turning the spent NaS cell 30 in a direction away from the arm 21 as viewed in an upper portion of the cell. However, in this case the peeled outer tube falls on the apparatus side, so that it may be caught by the apparatus. In order to solve this trouble, according to a second embodiment of the peeling apparatus of the present invention shown in FIGS. 5 and 6, a chisel is used instead of the pawl 20 in the first embodiment, and the peeled outer tube is dropped on a side opposite to the apparatus.

Figure 6:
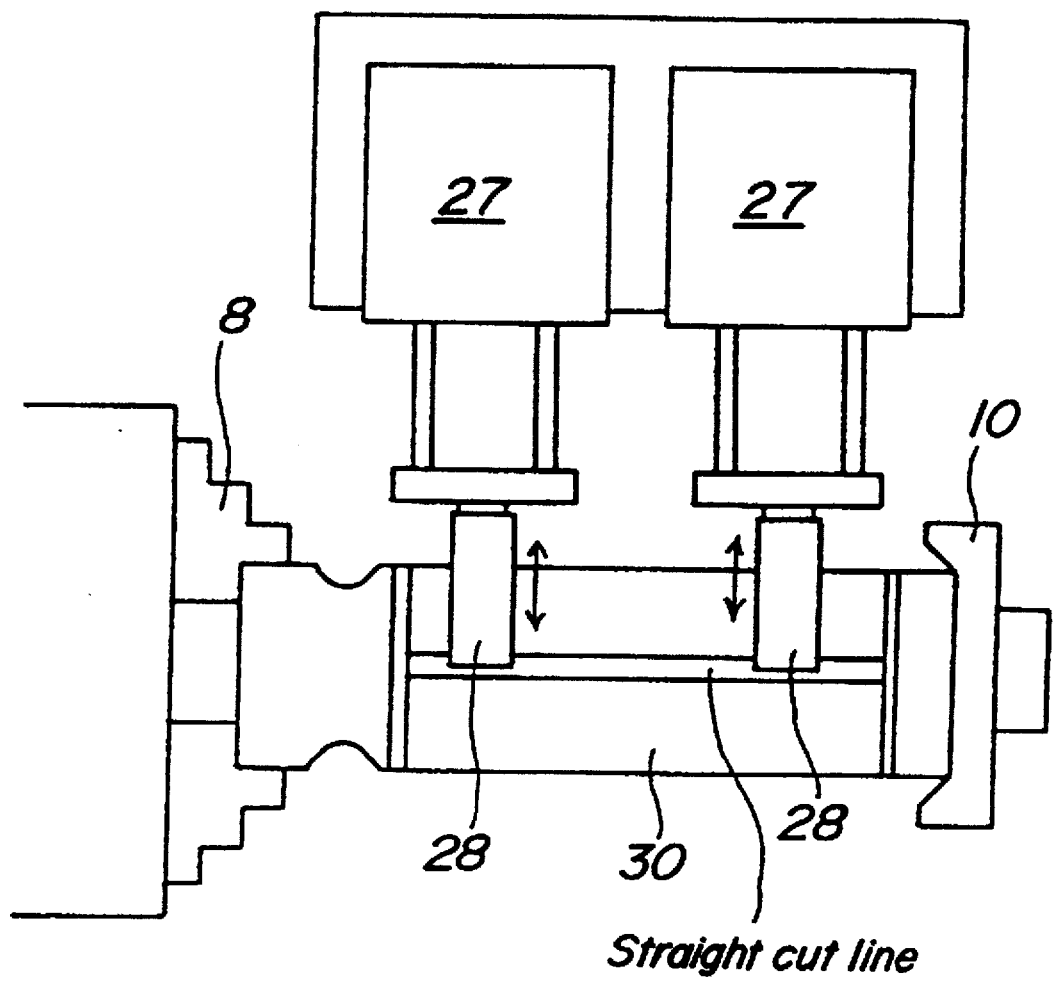
FIG. 6 is a plane view of an apparatus for peeling an outer tube of a spent NaS cell as a further embodiment according to the present invention.

That is, in FIGS. 5 and 6, a pole 25 is erected on the slide table 13, and a cylinder 27 is supported at an upper end of the pole 25, whereas a swing cylinder 26 is connected to an intermediate under portion of the cylinder 27 to adjust an inclination angle of the cylinder 27. A chisel 28 is provided at each tip of the rods of the cylinder 27. As shown in FIG. 6, two chisels 28 are provided in parallel in this embodiment, and a tip of each of the chisels 28 can be inserted into the straight cut line of the spent NaS cell formed by the cutting blade 16.

In this embodiment, while the spent NaS cell 30 is stationary, each of the chisels 28 is reciprocated at a speed of 500–1000 mm/sec under a load of 80 kgf or more to repeatedly applying impact forces upon the end face of the outer tube along the straight cut line. The impact force-applying direction is preferably a direction tangential to the spent NaS cell. In FIG. 5, when the rod of the cylinder 27 advances in the left direction, an impact force is applied to the spent NaS cell 30. By so doing, a portion of the outer tube between the annular cut lines is peeled from the surface of the remaining spent NaS cell 30, and is dropped on a side opposite to the apparatus. The second embodiment has an advantage that the peeled outer tube is not caught by the peeling apparatus.

As having been explained, according to the present invention, the outer tube can be automatically peeled from the spent NaS cell by using a single peeling apparatus. Accordingly, the peeling efficiency can be enhanced. Since a plurality of peeling apparatuses need not be provided unlike the conventional technique, the construction cost can be reduced. Therefore, the present invention affords a great industrial value as the process and apparatus for peeling the outer tube from the spent NaS cell, which solve the problems of the prior art.

What is claimed is:

1. A process for peeling an outer tube of a spent NaS cell, comprising the steps
   (1) holding opposite end portions of the spent NaS cell;
   (2) forming annular cut lines in the outer tube of the cell at the opposite end portions;
   (3) forming a straight cut line in the outer tube to be continued to the annular cut lines;
   (4) inserting a pawl into the straight cut line; and
   (5) peeling the outer tube of the spent NaS cell by turning at least one of the spent NaS cell and the pawl relative to each other.

2. An apparatus for peeling an outer tube from a spent NaS cell, comprising a holder for holding opposite ends of the spent NaS cell, a cutter for forming an annular cut line and a straight cut line in the outer tube of the spent NaS cell, a peeler including a pawl to be inserted into the straight cut line formed in the outer tube of the spent NaS cell and adapted for peeling the outer tube by using the pawl, and means for turning at least one of the spent NaS cell and the pawl so that the cell and the pawl may be turned relative to each other.

3. The apparatus claimed in claim 2, wherein the holder includes chucks attached to tips of spindles for a head stock and a tail stock, respectively, and the spent NaS cell is turned by a motor via the spindle of the head stock.

4. The apparatus claimed in claim 2, wherein a first slide table is slidably movable on and along a longitudinal rail, a second slide table is slidably movable on and along a lateral rail fixedly placed on the first slide table, the cutter is installed on the second slide table, and the peeler is placed on the first slide table, whereby the cutter is movable in longitudinal and lateral directions, whereas the peeler is movable in the longitudinal direction.

5. The apparatus claimed in claim 3, wherein a first slide table is slidably movable on and along a longitudinal rail, a second slide table is slidably movable on and along a lateral rail fixedly placed on the first slide table, the cutter is installed on the second slide table, and the peeler is placed on the first slide table, whereby the cutter is movable in longitudinal and lateral directions, whereas the peeler is movable in the longitudinal direction.

* * * * *